US006519698B1

(12) United States Patent
Leyda et al.

(10) Patent No.: US 6,519,698 B1
(45) Date of Patent: *Feb. 11, 2003

(54) METHOD FOR SAVING SYSTEM CONFIGURATION INFORMATION TO SHORTEN COMPUTER SYSTEM INITIALIZATION TIME BY CHECKING THE STATE OF A CHASSIS INTRUSION DETECTION CIRCUIT

(75) Inventors: Jeffrey J. Leyda, Minneapolis, MN (US); Robert R. Hoffman, Jr., Mounds View, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/414,656

(22) Filed: Oct. 6, 1999

(51) Int. Cl.$^7$ .............................................. G06F 9/445
(52) U.S. Cl. ............................... 713/2; 713/2; 713/100
(58) Field of Search ................................. 713/1, 2, 100

(56) References Cited

U.S. PATENT DOCUMENTS

| | | | |
|---|---|---|---|
| 4,920,432 A | 4/1990 | Eggers et al. | 360/33.1 |
| 5,269,022 A | 12/1993 | Shinjo et al. | 395/700 |
| 5,307,497 A | 4/1994 | Feigenbaum et al. | 395/700 |
| 5,327,531 A | 7/1994 | Bealkowski et al. | 395/164 |
| 5,339,426 A | * 8/1994 | Aoshima | 713/1 |
| 5,388,267 A | 2/1995 | Chan et al. | 395/700 |
| 5,519,832 A | 5/1996 | Warchol | 395/183.22 |
| 5,564,054 A | 10/1996 | Bramnick et al. | 395/700 |
| 5,615,330 A | 3/1997 | Taylor | 395/182.05 |
| 5,630,048 A | 5/1997 | La Joie et al. | 395/183.01 |
| 5,634,137 A | 5/1997 | Merkin et al. | 395/830 |
| 5,657,448 A | 8/1997 | Wadsworth et al. | 395/200.5 |
| 5,664,194 A | 9/1997 | Paulsen | 395/712 |
| 5,710,930 A | 1/1998 | Laney et al. | 395/750 |
| 5,732,268 A | 3/1998 | Bizzarri | 395/652 |
| 5,761,505 A | 6/1998 | Golson et al. | 395/653 |

(List continued on next page.)

OTHER PUBLICATIONS

Chapter 21: "RTC and Configuration RAM".
Chapter 15: "ROM Memory".
Chapter 7: "The Power–Up Sequence".
"Microprocessor System Hardware Monitor", National Semi Conductor, Mar. 1998.
"Microprocessor System Hardware Monitor", National Semi Conductor, Product Folder, Jul. 7, 1998.
"Plug and Play ISA Specification", Version 1.0a, May 5, 1994.
"Plug and Play BIOS Specification", Version 1.0a, May 5, 1994, Compaq Computer Corporation, Phoenix Technologies Ltd., Intel Corporation.

*Primary Examiner*—Thomas Lee
*Assistant Examiner*—James K. Trujillo
(74) *Attorney, Agent, or Firm*—Park Vaughan & Fleming LLP

(57) ABSTRACT

One embodiment of the present invention provides a method that reduces the time required to gather system configuration information during an initialization process within a computer system. The method operates by checking a chassis intrusion detection circuit within the computer system to determine whether a chassis of the computer system has been opened. If the chassis intrusion detection circuit indicates that the chassis has been opened, the method performs a normal initialization operation that gathers system configuration information by communicating directly with computer system components to determine a state of the computer system components. This system configuration information is stored in a nonvolatile storage device. If the chassis intrusion detection circuit indicates that the chassis has not been opened, the method performs an abbreviated initialization operation that retrieves the system configuration information from the nonvolatile storage device without having to communicate directly with the computer system components.

20 Claims, 2 Drawing Sheets

U.S. PATENT DOCUMENTS

| | | | |
|---|---|---|---|
| 5,768,148 A | 6/1998 | Murphy et al. | 364/492 |
| 5,930,503 A | 7/1999 | Drees | 395/651 |
| 5,933,594 A | 8/1999 | La Joie, et al. | 395/183.01 |
| 6,092,135 A * | 7/2000 | Kwon | 710/10 |
| 6,282,640 B1 * | 8/2001 | Klein | 710/104 |
| 6,292,859 B1 * | 9/2001 | Santiago | 710/10 |
| 6,434,697 B1 * | 8/2002 | Leyda et al. | 713/2 |

* cited by examiner

METHOD FOR SAVING SYSTEM CONFIGURATION INFORMATION TO SHORTEN COMPUTER SYSTEM INITIALIZATION TIME BY CHECKING THE STATE OF A CHASSIS INTRUSION DETECTION CIRCUIT

RELATED APPLICATION

The subject matter of this application is related to the subject matter in a co-depending non-provisional application by the same inventors as the instant application and filed on the same day as the instant application entitled, "Apparatus for Saving System Configuration Information to Shorten Computer System Initialization Time," having Ser. No. 09/414,655, and filing date Oct. 6, 1999.

BACKGROUND

1. Field of the Invention

The present invention relates to initializing computer systems. More specifically, the present invention relates to a system that reduces the time required to detect and configure devices within a computer system during a computer system initialization operation by saving previously gathered system configuration information.

2. Related Art

As computer systems have grown increasingly more complicated, the amount of time spent detecting and initializing computer system components during the computer system initialization process has also increased. This has increased the amount of time a computer system user must wait before being able to use the computer system.

A computer system typically performs a number of functions to detect and configure devices within the computer system during the initialization process. For example, the computer system can detect and configure various bus devices within the computer system. The computer system can detect the size and speed of DIMMs (dual in-line memory modules) that are present in the system, and can use this information to program a memory controller. The computer system can read information regarding CPU speed from a processor, and can use this information to configure a clock frequency generator for the processor.

Components within a computer system rarely change between computer system initialization operations. This means the computer system repeats the same steps of detecting and initializing computer system components, even though the configuration rarely changes. Thus, much of the time spent detecting and initializing computer system components during the computer system initialization process is largely wasted.

What is needed is a computer system that does not waste time detecting and initializing computer system components during the computer system initialization process.

SUMMARY

One embodiment of the present invention provides a method that reduces the time required to gather system configuration information during an initialization process within a computer system. The method operates by checking a chassis intrusion detection circuit within the computer system to determine whether a chassis of the computer system has been opened. If the chassis intrusion detection circuit indicates that the chassis has been opened, the method performs a normal initialization operation that gathers system configuration information by communicating directly with computer system components to determine a state of the computer system components. This system configuration information is stored in a nonvolatile storage device. If the chassis intrusion detection circuit indicates that the chassis has not been opened, the method performs an abbreviated initialization operation that retrieves the system configuration information from the nonvolatile storage device without having to communicate directly with the computer system components.

In one embodiment of the present invention, the method determines if the system configuration information has been saved previously in the nonvolatile storage device. If not, the method performs the normal initialization operation that gathers system configuration information by communicating directly with the computer system components, and saves the system configuration information in the nonvolatile storage device.

In one embodiment of the present invention, the method determines if the initialization process is taking place during a computer system power up. If not, the method performs the abbreviated initialization operation that retrieves the system configuration information from the nonvolatile storage device.

In one embodiment of the present invention, the method resets the chassis intrusion detection circuit after saving the system configuration information in the nonvolatile storage device, so that the chassis intrusion detection circuit indicates that the chassis has not been opened.

In one embodiment of the present invention gathering system configuration information further comprises setting configuration parameters for at least one of the computer system components.

DETAILED DESCRIPTION

The following description is presented to enable any person skilled in the art to make and use the invention, and is provided in the context of a particular application and its requirements. Various modifications to the disclosed embodiments will be readily apparent to those skill in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Computer System

Figure 1:
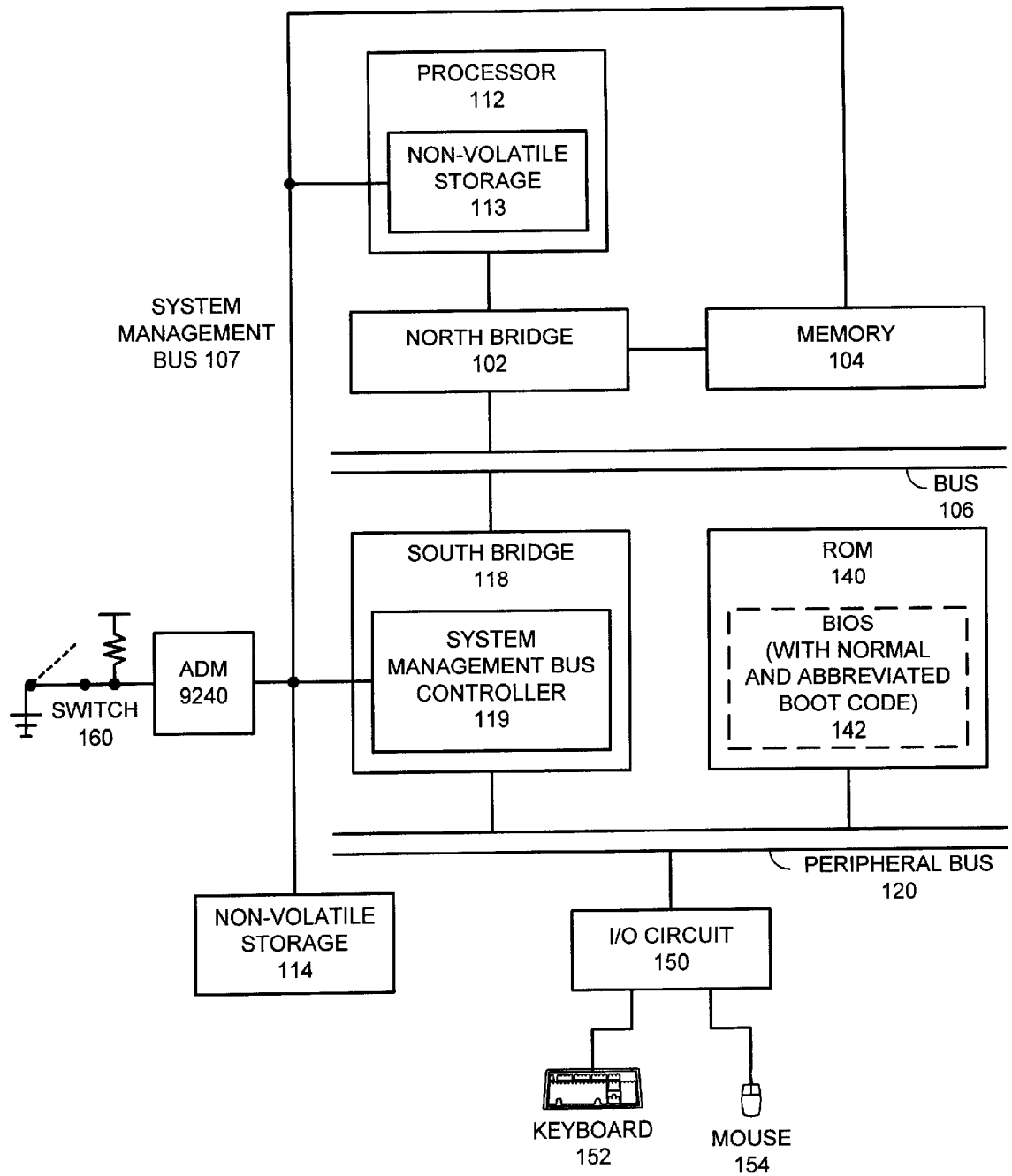
FIG. 1 illustrates a computer system in accordance with an embodiment of the present invention.

FIG. 1 illustrates a computer system in accordance with an embodiment of the present invention. The computer system illustrated in FIG. 1 includes processor 112 which is coupled to north bridge 102. Processor 112 can include any type of general or special purpose processor, including, but not limited to, a microprocessor, a mainframe computer, a digital signal processor, a graphics processor and a device controller.

North bridge 102 couples processor 112 with memory 104 and bus 106. Memory 104 can include any type of volatile or nonvolatile random access memory.

Bus 106 couples north bridge 102 to south bridge 118. Bus 106 can include any type of communication channel for coupling north bridge 102 to other devices in the computer system, including peripheral devices and memory devices. In one embodiment of the present invention, bus 106 is a PCI bus.

South bridge 118 includes circuitry for coupling together components of the computer system. More, particularly, south bridge 118 couples bus 106 to peripheral bus 120.

Peripheral bus 120 can include any type of communication channel for coupling south bridge 118 to other devices in a computer system, including peripheral devices and memory devices. In one embodiment of the present invention, peripheral bus 120 includes an ISA bus. Peripheral bus 120 is coupled to ROM 140, which contains BIOS 142. Note that BIOS 142 includes normal and abbreviated versions of an initialization program in accordance with an embodiment of the present invention. Peripheral bus 120 is additionally coupled I/O circuit 150. I/O circuit 150 couples keyboard 152 and mouse 154 to the computer system.

The computer system illustrated in FIG. 1 includes intrusion detection circuitry in the form of switch 160, which is normally closed. When a chassis of the computer system is opened, switch 160 is opened. This causes an input of ADM 9240 to rise to a high voltage level. ADM 9240 is a chip manufactured by the Analog Devices Corporation that performs a number of functions, including monitoring computer system temperature and voltage. Note that in general any type of intrusion detection circuitry may be used in place of switch 160. This includes, but is not limited to, electrical, optical, an mechanical devices that can monitor when a chassis of the computer system has been opened. The only requirement is that the circuitry must be able to detect and remember if the computer system configuration has been changed.

Note that the term "chassis intrusion detection circuitry" as used in this specification generally refers to circuitry that can detect any change in the hardware configuration of the computer system, and is not necessarily limited to systems that detect whether the computer system chassis has been opened. For example, the term "chassis intrusion detection circuitry " can refer to circuitry that detects whether a board has been removed from the computer system.

ADM 9240 is coupled to system management bus 107. System management bus 107 is a communication channel that is used to control computer system functions. System management bus 107 operates under control of system management bus controller 119 within south bridge 118.

System management bus 107 is coupled to nonvolatile storage 113 and 114. Nonvolatile storage 113 and 114 can include any type of storage device that preserves data when computer system power is turned off. This can include, flash memory, magnetic storage devices, and battery-backed up RAM. Note that nonvolatile storage 113 exists on the same chip as processor 112, which can save on the cost of an external memory device. Alternatively, nonvolatile storage 114 resides off-chip in a separate package.

Note that system management bus 107 is also coupled to memory 104. This allows the computer system to detect what type of memory is contained within memory 104.

The system illustrated in FIG. 1 operates generally as follows during a system initialization process. The computer system executes BIOS 142, which queries ADM 9240 to determine if the chassis of the computer system has been opened. If so, the computer system performs a normal initialization process that detects and configures various components within the computer system, and stores system configuration information obtained during the initialization process into nonvolatile storage 113 or 114. Otherwise, the computer system performs an abbreviated initialization operation, which retrieves system configuration information from nonvolatile storage 113 or 114 instead of taking the time to detect and configure the computer system components.

Initialization Process

Figure 2:
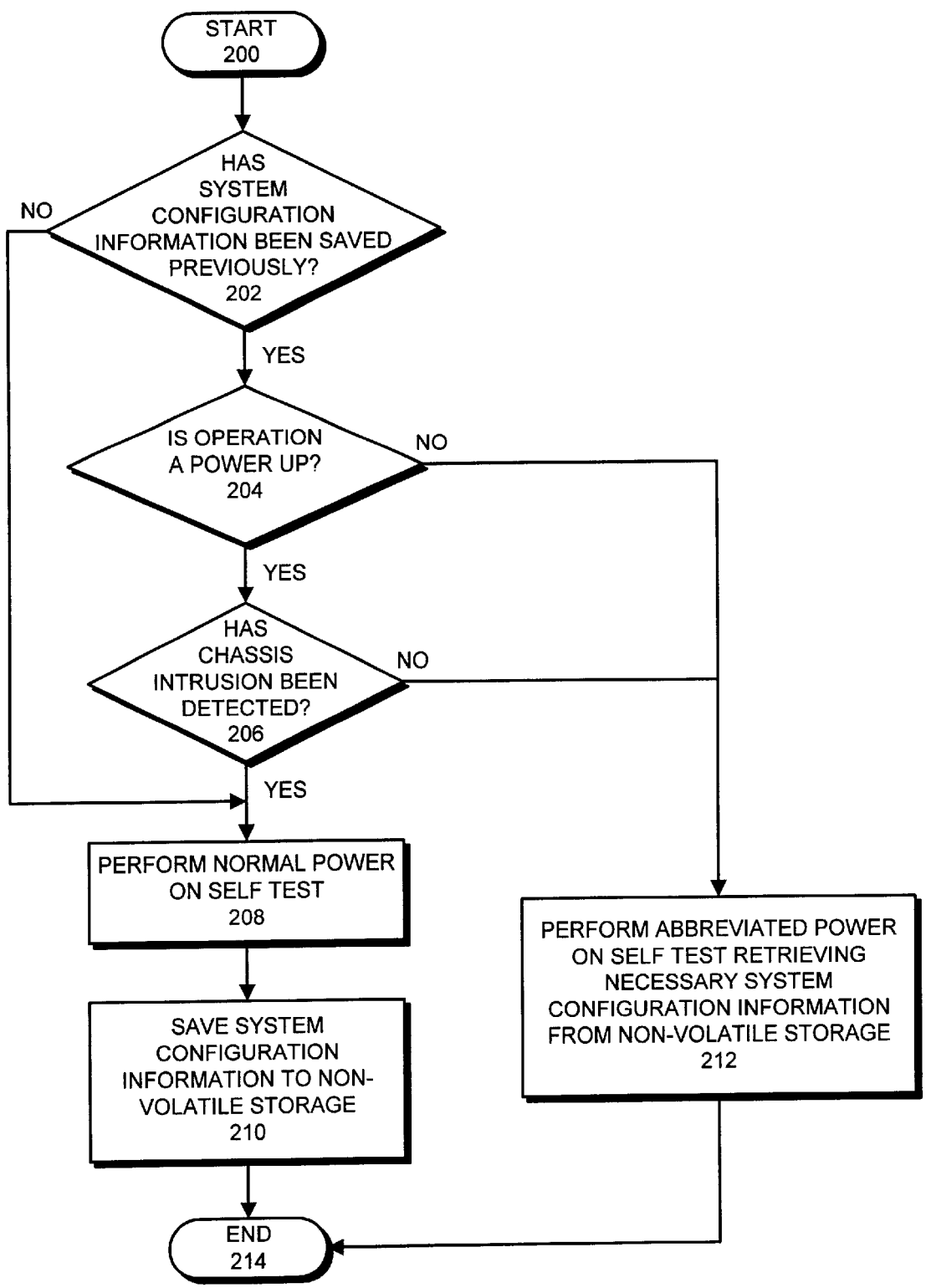
FIG. 2 is a flow chart illustrating the computer system initialization process in accordance with an embodiment of the present invention.

FIG. 2 is a flow chart illustrating the computer system initialization process in accordance with an embodiment of the present invention. During a computer system initialization operation, the computer system executes code from BIOS 142 within ROM 140 to perform system initialization functions. The system starts by determining if system configuration information has been saved previously (step 202). If not, the system proceeds to step 208.

If system configuration information has been saved previously, the system determines whether the system initialization is happening as part of a power up operation (step 204). If so, the system determines a chassis intrusion has been detected through switch 160 in FIG. 1 (step 206). If it is not part of a power up operation, the system performs an abbreviated POST process using system configuration information retrieved from nonvolatile storage 113 or 114 (step 212). This reduces the need to detect and configure devices in the computer system, and thereby reduces the time required to perform the system initialization process.

If a chassis intrusion has been detected in step 206, the system performs a normal power on self-test (POST) process in which various computer system components are detected and appropriately configured (step 208). During the POST process, the system can perform a number of different functions that detect and configure devices in the computer system. (1) The system can read information regarding CPU speed from each processor, and can use this information to configure clock frequency generators for the processors. This requires a system reset after programming the generators. (2) The system can detect the size and speed of DIMMs (dual in-line memory modules) that are present in the system, and can use this information to program a memory controller to access the DIMMs. (3) The system can perform plug and play detection by stepping through peripheral component interconnect (PCI) configuration space looking for PCI devices in the computer system. (4) The system can perform auto-detection for any IDE devices attached to the system, such as hard drive controllers. (5) The system can scan through memory looking for ROM signatures belonging to add-in cards. If add-in card is found, the system can verify a check sum that is stored in the add-in card.

Note that each of the above-listed function (and many other possible functions) within the POST process can be skipped during an abbreviated post process, and the needed information can be retrieved from nonvolatile storage 113 or 114.

After the normal POST process is complete, the system saves the system configuration information gathered during the post process in nonvolatile memory 113 or 114 (step 210).

If a chassis intrusion has not been detected in step 206, the system performs an abbreviated POST (step 212).

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method that reduce an amount of time required to gather system configuration information during an initialization process within a computer system, comprising:

> checking a state of a chassis intrusion detection circuit within the computer system to determine whether a chassis of the computer system has been opened;
>
> if the chassis intrusion detection circuit indicates that the chassis has been opened,
>
>> performing a normal initialization operation that gathers system configuration information by communicating directly with a plurality of computer system components to determine a state of the plurality of computer system components,
>>
>> configuring the devices with, the system configuration information, and
>>
>> saving the system configuration information in a nonvolatile storage device; and
>
> if the chassis intrusion detection circuit indicates that the chassis has not been opened, performing an abbreviated initialization operation that retrieves the system configuration information from the nonvolatile storage device without having to communicate directly with the plurality of computer system components, and
>
> configuring the devices with the system configuration information; wherein the nonvolatile storage device resides within a microprocessor chip in the computer system.

2. The method of claim 1, further comprising determining if the system configuration information has been saved previously in the nonvolatile storage device, and if not, > performing the normal initialization operation that gathers system configuration information by communicating directly with the plurality of computer system components, and
>
> saving the system configuration information in the nonvolatile storage device.

3. The method of claim 1, further comprising determining if the initialization process is taking place during a computer system power up, and if not performing the abbreviated initialization operation that retrieves the system configuration information from the nonvolatile storage device.

4. The method of claim 1, further comprising resetting the chassis intrusion detection circuit after saving the system configuration information in the nonvolatile storage device, so that the chassis intrusion detection circuit indicates that the chassis has not been opened.

5. The method of claim 1, wherein gathering system configuration information includes setting configuration parameters for at least one of the plurality of computer system components.

6. The method of claim 1, wherein the normal initialization operation and the abbreviated initialization operation are performed by executing code within a computer system BIOS stored in a nonvolatile memory.

7. The method of claim 1, wherein gathering system configuration information includes reading information specifying a central processing unit (CPU) clock speed, and using this information to configure a clock frequency generator for the CPU.

8. The method of claim 1, wherein gathering system configuration information includes detecting a size and a speed of a memory module in the computer system and programming memory controller to accommodate the memory module.

9. The method of claim 1, wherein gathering system configuration information includes performing Plug and Play detection by stepping through peripheral component interconnect (PCI) configuration space looking for devices.

10. The method of claim 1, wherein gathering system configuration information includes detecting peripheral devices attached to the computer system.

11. The method of claim 1, wherein gathering system configuration information includes scanning through memory looking for ROM signatures belonging to add-in cards, and if an add-in card is detected verifying a checksum for the add-in card.

12. A method that reduces an amount of time required to gather system configuration information during an initialization process within a computer system, comprising:

> determining if the system configuration information has been saved previously in a nonvolatile storage device;
>
> if the system configuration information has not been saved previously in the nonvolatile storage device,
>
>> performing a normal initialization operation that gathers system configuration information by communicating directly with a plurality of computer system components to determine a state of the plurality of computer system components,
>>
>> configuring the devices with the system configuration information, and
>
> saving the system configuration information in the nonvolatile storage device;
>
> if the system configuration information has been saved previously in the nonvolatile storage device, determining if the initialization process is taking place during a computer system power up,
>
> if the initialization process is taking place during a computer system power up,
>
>> checking a state of a chassis intrusion detection circuit within the computer system to determine whether a chassis of the computer system has been opened,
>>
>> if the chassis intrusion detection circuit indicates that the chassis has been opened,
>>
>>> performing the normal initialization operation that gather system configuration information by communicating directly with a plurality of computer system components,
>>>
>>> configuring the devices with the system configuration information,
>>>
>>> saving the system configuration information in the nonvolatile storage device, and
>>>
>>> resetting the chassis intrusion detection circuit, so that the chassis intrusion detection circuit indicates that the chassis has not been opened, and
>>
>> if the chassis intrusion detection circuit indicates that the chassis has not been opened, performing an abbreviated initialization operation that retrieve the system configuration information from the nonvolatile storage device without having to communicate directly with the plurality of computer system components;
>>
>> configuring the devices with the system configuration information; and if the initialization process is not taking place during a computer system power up, performing the abbreviated initialization operation;

wherein the nonvolatile storage device resides within a microprocessor chip in the computer system.

13. The method of claim 12, wherein gathering system configuration information includes setting configuration parameters for at least one of the plurality of computer system components.

14. The method of claim 13, wherein the normal initialization operation and the abbreviated initialization operation are performed by executing code within a computer system BIOS located in a nonvolatile memory.

15. The method of claim 12, wherein gathering system configuration information includes reading information specifying a central processing unit (CPU) clock speed, and using this information to configure a clock frequency generator for the CPU.

16. The method of claim 12, wherein gathering system configuration information includes detecting a size and a speed of a memory module in the computer system and programming memory controller to accommodate the memory module.

17. The method of claim 12, wherein gathering system configuration information includes performing Plug and Play detection by stepping through peripheral component interconnect (PCI) configuration space looking for devices.

18. The method of claim 12, wherein gathering system configuration information includes detecting peripheral devices attached to the computer system.

19. The method of claim 12, wherein gathering system configuration information includes scanning through memory looking for ROM signatures belonging to add-in cards, and if an add-in card is detected verifying a checksum for the add-in card.

20. A computer-readable storage medium storing instructions that when executed by a computer cause the computer to perform a method that reduces an amount of time required to gather system configuration information during an initialization process within a computer system, comprising:

checking a state of a chassis intrusion detection circuit within the computer system to determine whether a chassis of the computer system has been opened;

if the chassis intrusion detection circuit indicates that the chassis has been opened,
- performing a normal initialization operation that gathers system configuration information by communicating directly with a plurality of computer system components to determine a state of the plurality of computer system components,
- configuring the devices with the system configuration information, and
- saving the system configuration information in a nonvolatile storage device; and if the chassis intrusion detection circuit indicates that the chassis has not been opened, performing an abbreviated initialization operation that retrieves the system configuration information from the nonvolatile storage device without having to communicate directly with the plurality of computer system components, and configuring the devices with the system configuration information;

wherein the nonvolatile storage device resides within a microprocessor chip in the computer system.

* * * * *